UNITED STATES PATENT OFFICE.

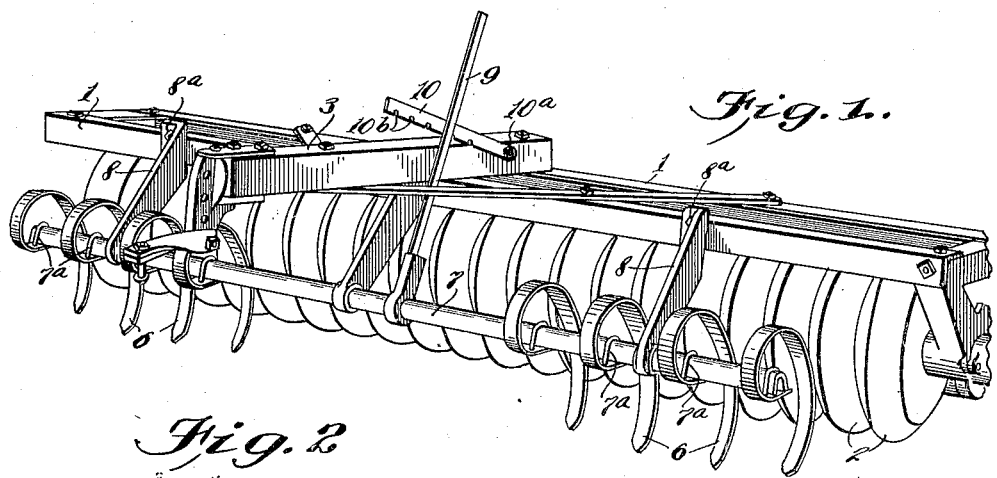
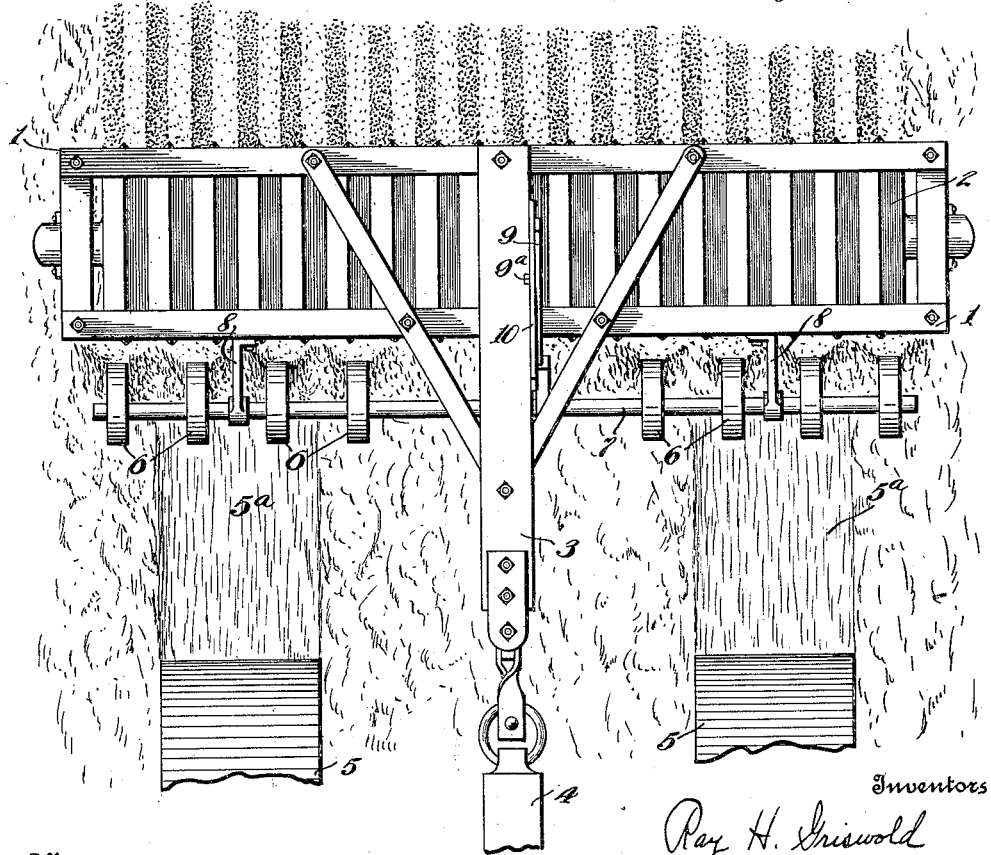

RAY H. GRISWOLD, OF CLEVELAND, AND EARL J. POWELL, OF BEREA, OHIO, ASSIGNORS TO THE DUNHAM COMPANY, A CORPORATION OF OHIO.

TRACTOR-TRACK OBLITERATOR.

1,422,967. Specification of Letters Patent. Patented July 18, 1922.

Application filed August 22, 1919. Serial No. 319,069.

*To all whom it may concern:*

Be it known that we, RAY H. GRISWOLD and EARL J. POWELL, citizens of the United States, residing at Cleveland and Berea, respectively, in the county of Cuyahoga and State of Ohio, have invented certain new and useful Improvements in Tractor-Track Obliterators, of which the following is a specification.

The invention relates to tractor track eradicators for tractor drawn implements, the primary object of the invention being, as the name implies, to provide a tractor drawn implement with separate earth working means for effacing or obliterating the tracks left by the tractor implement so that no trace of the same will be left in the cultivated soil after being passed over by the tillage implement.

A further object of the invention is to provide a tractor drawn tillage implement which will not only thoroughly cultivate the soil at the rear of the tractor, leaving no trace of the tractor tracks, but to provide track eradicating earth working elements which may be readily attached to the frame of any ordinary tractor drawn implement and readily brought into and out of engagement with the tracks left by the tractor, as well as one which may be readily adapted to meet the varying demands of actual service.

While we have shown our improved device attached to a tractor drawn implement of the soil pulverizing disc type, it will of course be obvious that the improvements may be readily attached and conformed to soil tilling implements of varying specific forms and varying characteristics and uses.

With the above mentioned and other ends in view, the invention consists in the novel construction, arrangement and combination of parts, hereinafter described, illustrated in one of its embodiments in the accompanying drawings and particularly pointed out in the appended claims.

Referring to the drawings, forming a part of this specification, Figure 1, is a perspective view of an implement of the soil pulverizing disc type equipped with a tractor track eradicator constructed and arranged in accordance with this invention.

Fig. 2, a top plan view of the same in its active or track obliterating position attached to an ordinary tractor implement, the draw bar and traction elements being merely illustrated for the purpose of illustrating the arrangement and function of the parts.

Similar numerals of reference designate like parts throughout all the figures of the drawings.

The tractor drawn tillage implement may be of any suitable and convenient form and so likewise the earth working elements thereof. In the present instance, we have shown our invention applied to a tillage implement of the soil pulverizer disc type consisting of a frame 1, and earth working elements 2, in the specific form of soil pulverizer roller discs, the implement frame 1, being provided with a centrally located draft element or draw bar 3.

The draft member 3, is adapted to be attached to the tractor implement in any suitable and convenient manner, in the present instance, by means of the tractor draw bar 4, the traction elements 5, being somewhat diagrammatically illustrated and the tracks 5ª, left by the latter in the soil being cultivated being indicated by reference numeral 5ª.

As a means of eliminating or obliterating the tracks 5ª, in advance of the earth working elements of the tractor drawn implement, suitable earth working tractor track removing means are arranged between the traction elements 5, and the earth working elements of the tractor drawn implement, said track removing or obliterating means, in the present instance, comprising suitable track eradicating elements 6, adapted to traverse and eradicate the tracks 5ª, said elements 6, in the present instance, comprising spring tooth members arranged on a support 7, suitably arranged between the tractor and tillage implements, said support 7, in the present instance, comprising a tooth carrying bar rotatably mounted in bearing brackets 8. The bearing brackets 8, may be attached to any suitable part of the implement frame and, in the present instance, are attached to the front member of the frame and extend downwardly and forwardly, being detachably connected to the frame member 1, by means of bolts 8ª.

The track obliterating earth working elements 6, are preferably adjustably and detachably connected to the tooth carrying bar 7, by means of U-bolts or clamps 7ª, the open or flanged side of the substantially U-shaped bar 7, forming a convenient support for the base portions of the track obliterating elements 6, which in the present instance are in the specific form of spring teeth. The track obliterating earth working elements 6, are adapted to be adjusted and varied to meet the varying exigencies of actual service and are preferably arranged in groups to cover the tracks 5ª, and spaced apart so as to thoroughly obliterate the tracks 5ª, in advance of the earth working elements of the implement, substantially as indicated in Fig. 2, of the drawings.

As a means of bringing the elements 6, into and out of engagement with the soil covered by the tracks 5ª, and particularly as a means of adjusting said elements 6, as desired, the movable supporting or bar 7, is provided near its center with an upwardly extending operating handle 9, said handle being adapted to be held in its respective positions in any suitable and convenient manner, in the present instance, by means of an oscillatory bar 10, pivotally connected to the draw bar 3, by means of a pivot bolt 10ª, said bar 10, being provided on its under side with a plurality of stop notches 10ᵇ, adapted to receive and take over a laterally extending projection or bolt 9ª, of the lever.

From the foregoing description, taken in connection with the accompanying drawings, the operation and advantages of our invention will be readily understood.

Having thus described one of the embodiments of our invention, without having attempted to set forth all the forms in which it may be made or all the modes of its use, what we claim and desire to secured by Letters Patent, is,—

1. In a tractor track eradicator for implements, an implement including a frame and a centrally located draft element, together with earth working elements below said frame, forwardly and downwardly extending bearing brackets detachably secured to said frame and extending in front of said earth working elements, an oscillatory tooth carrying bar in said bearing brackets below said frame and in front of said earth working elements, a plurality of earth working tooth bars adjustably carried by said bar and spaced apart in groups to correspond with the tractor elements of the attached tractor and adapted to traverse and eradicate the tracks thereof in front of said earth working elements of the implement, a hand lever on said tooth carrying bar extending upwardly in front of said implement frame, said hand lever extending at the side of said centrally located draft element and being provided with a lateral projection, and an oscillatory gravity bar on said draft bar provided on its under side with notches adapted to engage said projection of said hand lever in various positions.

2. A tractor track eradicator for tractor drawn implements, comprising forwardly and downwardly extending bearing brackets detachably secured to the front of the frame of the implement, a transverse tooth carrying bar rotatably mounted in said brackets, a plurality of earth working tooth bars mounted in groups on said carrying bar and spaced apart corresponding to the space between the traction elements of the tractor and adapted to traverse and eradicate the tracks thereof, a hand lever on said tooth carrying bar extending upwardly in front of said implement frame, and an oscillatory bar provided with notches adapted to engage said hand lever in various positions when adjusted.

3. A tractor drawn implement including a frame and a centrally located draft element, together with earth working elements below said frame, a plurality of forwardly and downwardly extending bearing brackets detachably secured to said frame and extending in front of said earth working elements, an oscillatory tooth carrying bar mounted in said bearing brackets below said frame and in front of said earth working elements, a plurality of earth working tooth bars adjustably carried by said bar and spaced apart in groups to correspond with the tractor elements of the tractor and adapted to traverse and eradicate the tracks thereof in front of said earth working elements of the implement, a hand lever on said tooth carrying bar extending upwardly in front of said implement frame, and an oscillatory bar provided with notches adapted to engage said lever in various positions and to adjust the same.

4. A tractor drawn implement including a frame and a centrally located draft bar, together with earth working elements below said frame, a plurality of downwardly extending bearing brackets secured to said frame and extending in front of said earth working elements, an oscillatory tooth carrying bar removably mounted in said bearing brackets below said frame and in front of said earth working elements, earth working tooth bars carried by said bar and spaced apart in groups to correspond with the tractor elements of the tractor and adapted to traverse and eradicate the tracks thereof in front of said earth working elements of the implement, a lever on said tooth carrying bar extending upwardly in front of said implement frame and at the side of said central draft bar and provided with a lateral projection, and an oscillatory gravity bar on said draft bar provided on its under side with notches adapted to engage said lateral projection of said lever in various positions.

In testimony whereof we have affixed our signatures.

RAY H. GRISWOLD.
EARL J. POWELL.